Figure 1:
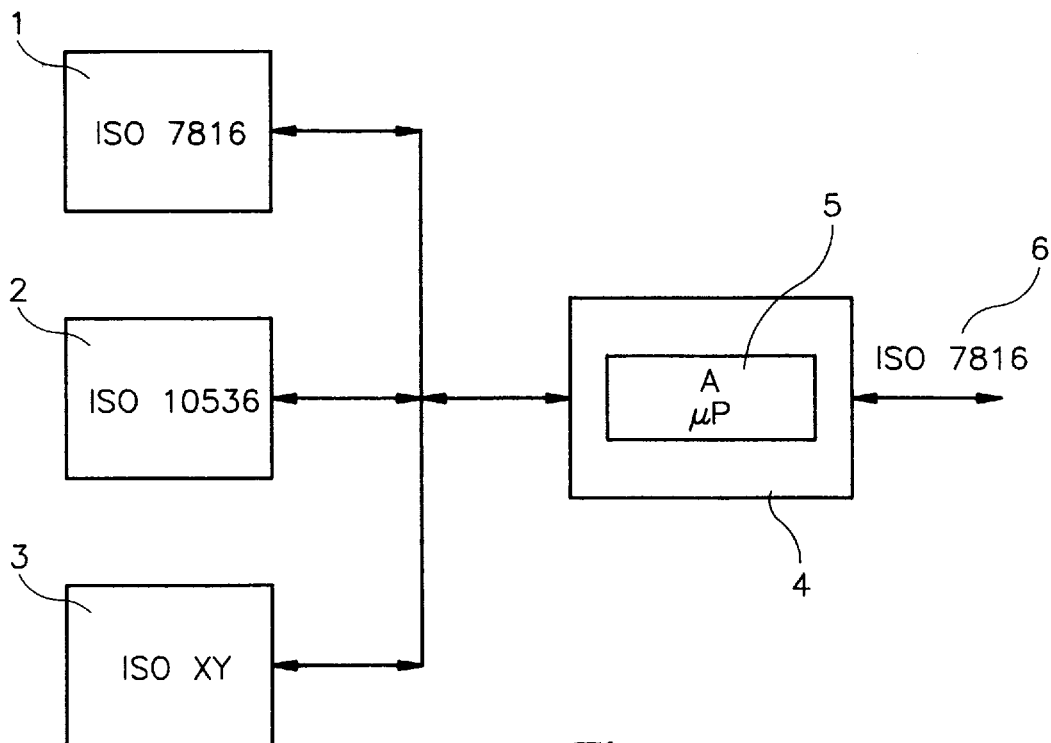

United States Patent [19]
Kreft

[11] Patent Number: 5,847,372
[45] Date of Patent: Dec. 8, 1998

[54] CHIP CARD

[75] Inventor: Hans-Diedrich Kreft, Dassendorf, Germany

[73] Assignee: CLM Combicard Licence Marketing GmbH & Co KG, Dassendorf, Germany

[21] Appl. No.: 702,709

[22] PCT Filed: Feb. 22, 1995

[86] PCT No.: PCT/DE95/00236

§ 371 Date: Sep. 3, 1996

§ 102(e) Date: Sep. 3, 1996

[87] PCT Pub. No.: WO95/24019

PCT Pub. Date: Sep. 8, 1995

[30] Foreign Application Priority Data

Mar. 2, 1994 [DE] Germany .......................... 44 06 704.6

[51] Int. Cl.[6] .................................................. G06K 19/06
[52] U.S. Cl. ............................................. 235/492; 235/387
[58] Field of Search ....................................... 235/387, 492

[56] References Cited

U.S. PATENT DOCUMENTS

| | | | |
|---|---|---|---|
| 4,822,988 | 4/1989 | Gloton | 235/492 |
| 5,049,728 | 9/1991 | Rovin | 235/492 |
| 5,126,568 | 6/1992 | Sekeguchi et al. | 235/492 |
| 5,444,222 | 8/1995 | Inoue | 235/380 |

FOREIGN PATENT DOCUMENTS

| | | | |
|---|---|---|---|
| 3935364 | 10/1989 | Germany | 235/492 |
| 9100861 | 1/1991 | Germany | 235/382.5 |
| 4406704 | 7/1995 | Germany | 235/379 |

*Primary Examiner*—Don Wong
*Assistant Examiner*—Daniel St. Cyr
*Attorney, Agent, or Firm*—Horst M. Kasper

[57] ABSTRACT

A connecting unit is provided for chip cards with an embedded IC and with and without contacts which makes it possible to recognize various applications of cards at a terminal and, depending on the application, to activate different microprocessors (5,7) on the card.

17 Claims, 1 Drawing Sheet

CHIP CARD

TECHNICAL OBJECTIVE

The invention relates to a chip card with several microcontrollers as well as connections for data exchange with read/write devices, whereby the connections are contact connections as well as contact-free connections and the read/write devices are capable of accessing the various microcontrollers separately, according to the generic part of claim 1.

STATE OF THE ART

Plastic cards are known as chip cards which exchange energy and data with their read/write devices with or without contacts. These cards are used for numerous applications such as, for example, telephone cards, medical cards, access control cards. A chip card of this type is known from German patent no. 3935364 C1.

German patent no. 91 00 861.9 U1 discloses a data carrier exchange arrangement that has a first microprocessor with first contacts arranged according to International Organization for Standardization (ISO) Standard 7816-2 (Part 2). The data carrier exchange arrangement has at least a second microprocessor with second contacts whose arrangement on the data carrier exchange arrangement does not correspond to the ISO Standard. This data carrier exchange arrangement can have contact connections as well as contact-free connections.

TECHNICAL OBJECTIVE

The invention is based on the objective of associating various card applications which are executed at a terminal (read/write device) using cards with various microcontrollers on the chip card.

DISCLOSURE OF THE INVENTION AND OF ITS ADVANTAGES

The objective is achieved according to the invention in that the connections are each made to a connecting unit which is either a separate electronic component or else is integrated into a conventional microcontroller and which, on the basis of the information available at one of the connections or on the basis of the physical configuration of the connections, decides which of the microcontrollers should enter into the data exchange with the read/write device, and in that the connecting unit establishes a connection for the data exchange between the connections and the appertaining microcontroller.

In an advantageous manner, the connecting unit is either a separate electronic component or it is integrated into a conventional microcontroller. Moreover, the connecting unit uses the physical configuration of the contact connections and/or of the contact-free connections to recognize which of the microcontrollers should enter into the data exchange with the read/write device.

The evaluation of the physical configuration of the contact connections and/or the contact-free connections can be carried out by signal transmission by unoccupied contacts on the chip card.

The connecting unit, which can be referred to as a Combi Interface Chip (CIC), is avantageously a component which, as a supplement to a microcontroller, can be used on chip cards or, with its functions according to the patent, can be integrated into a conventional card controller. In an advantageous manner, by means of the connection unit, it is possible to use a card at a terminal for an application A which requires the microcontroller A as well as at a terminal for an application B which requires the microcontroller B.

BRIEF DESCRIPTION OF THE DRAWINGS IN WHICH THE FOLLOWING IS SHOWN

Figure 2:
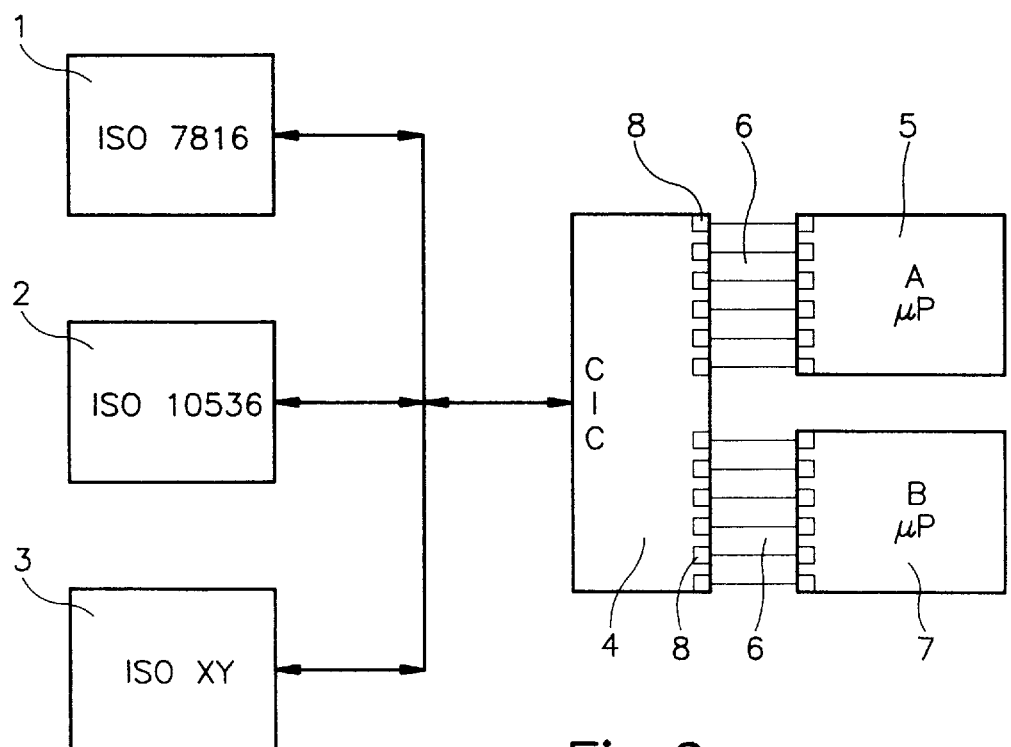

FIG. 1 schematic view of the various connections 1, 2, 3 to read/write devices outside of the chip card, in which the connecting unit is installed directly on the chip of a microcontroller and FIG. 2 another embodiment of a connecting unit in non-integrated form, whereby there are contact surfaces which allow the connection of a first microcontroller and of a second microcontroller.

WAYS TO EXECUTE THE INVENTION

FIG. 1 is a schematic view of the various connections 1, 2, 3 to read/write devices outside of the card. In their varying physical configurations, these connections are made to a connecting unit 4. The connecting unit 4 makes the various connections 1, 2, 3 in a uniform connection 6 available for the connection of additional chips. The connecting unit 4 is installed directly on the chip of a microcontroller 5 (A$\mu$P) (integrated solution).

On the basis of the physical configuration of the connections or of the information available at the connections to a read/write device, the connecting unit 4 must decide which microcontroller on the card is to be used. If, for example, the information coming from the read/write device indicates that microcontroller A is not meant for the task in question, the connection of the incoming information is switched over from this microcontroller to another connection 6 which is available for another microcontroller. The incoming information can be evaluated by software in the connecting unit 4 if the connecting unit 4 is configured as a microprocessor or by a hard-wired logic circuit on the connecting unit 4.

FIG. 2 shows another embodiment of the connecting unit 4 like in FIG. 1, but in a non-integrated form. In addition, contact surfaces 8 can be seen which allow the connection of a first microcontroller 5 (A$\mu$C) and of a second microcontroller 7 (B$\mu$C).

The function of the connecting unit 4 can be carried out on a chip card as a separate component, whereby contacts 8 are available for this purpose. However, the function can also be integrated into a microcontroller 5 so that this microcontroller 5 can also take over the evaluation of the information from the read/write devices.

The physical configuration of connections 1, 2, 3 also allows for a decision as to which microcontroller 5, 7 is to be used. If, for example, coils or condenser surfaces have been activated for a contact-free transmission, it is likewise possible to switch over to a specific connection 6.

Contact card fields on cards according to ISO Standard 7816 and in read/write devices sometimes have unoccupied contact connections. In an advantageous manner, these can be used by means of a physical signal evaluation for a recognition of the application and thus for a switchover in the connecting unit 4. For this purpose, for example, a voltage must be applied to the contact connections in the read/write devices.

COMMERCIAL APPLICABILITY

The subject matter of the invention can be used for chip cards, especially plastic cards, for purposes of data exchange in read/write devices. Such chip cards, which can exchange energy and data with read/write devices with or without contacts, are advantageously used for telephone cards, medical cards or access control cards.

I claim:

1. A chip card with several microcontrollers (5, 7) as well as connections (1, 2, 3) for data exchange with a read/write device, whereby the connections (1, 2, 3) are contact connections as well as contact-free connections and the read/write devices are capable of accessing the various microcontrollers (5, 7) separately, characterized in that the connections (1, 2, 3) are each made to a connecting unit (4), which connecting unit determines which of the microcontrollers (5, 7) should enter into the data exchange with the read/write device, and in that the connecting unit (4) establishes a connection (6) for the data exchange between the connections (1, 2, 3) and the appertaining microcontroller (5, 7).

2. The chip card according to claim 1, characterized in that determining of the physical configuration of the contact connections is carried out by signal transmission by unoccupied contacts on the chip card.

3. The chip card according to claim 1, wherein the connecting unit (4) is a separate electronic component.

4. The chip card according to claim 1, wherein the connecting unit (4) is integrated into a conventional microcontroller (5, 7).

5. The chip card according to claim 1, wherein the connecting unit determines on the basis of the information available at one of the connections (1, 2, 3) which of the microcontrollers (5, 7) should enter into the data exchange with the read/write device.

6. The chip card according to claim 1, wherein the connecting unit determines on the basis of the physical configuration of the connections (1, 2, 3) which of the microcontrollers (5, 7) should enter into the data exchange with the read/write device.

7. Chip card according to claim 1, characterized in that determining of the physical configuration of the contact-free connections (1, 2, 3) is carried out by signal transmission by unoccupied contacts on the chip card.

8. Chip card according to claim 2, characterized in that determining of the physical configuration of the contact-free connections (1, 2, 3) is carried out by signal transmission by unoccupied contacts on the chip card.

9. A chip card with a plurality of microcontrollers (5, 7) as well as connections (1, 2, 3) for a data exchange with a read/write apparatus, and wherein the plurality of microcontrollers (5, 7) are accessible separately, wherein the connections (1, 2, 3) are guided to a connecting unit (4), wherein the connecting unit (4) decides which of the microcontrollers (5, 7) is to enter into a data exchange with the read/write apparatus, wherein the connecting unit (4) subsequently establishes a connection (6) for the data exchange between the connections (1, 2, 3) and the respective selected microcontroller (5, 7).

10. The chip card according to claim 9, wherein the connections (1, 2, 3) are contact connections.

11. The chip card according to claim 9, wherein the connections (1, 2, 3) are contactless connections.

12. The chip card according to claim 9, wherein the connections (1, 2, 3) are contact connections and contactless connections.

13. The chip card according to claim 9, wherein the connecting unit (4) decides which of the microcontrollers (5, 7) is to enter into a data exchange with the read/write apparatus based on the information present at one of the connections (1, 2, 3).

14. The chip card according to claim 9, wherein the connecting unit (4) decides which of the microcontrollers (5, 7) is to enter into a data exchange with the read/write apparatus based on the physical configuration of the connections (1, 2, 3).

15. The chip card according to claim 9, wherein the connecting unit (4) is a separate electronic component.

16. The chip card according to claim 9, wherein the connecting unit (4) is integrated into a microcontroller (5, 7) of conventional construction.

17. The chip card according to claim 14, wherein an evaluation of the physical configuration of the connections (1, 2, 3) occur by signalling of unused contacts on the chip card.

* * * * *